350-333 SR
XR 4,042,920

United States Patent [19] [11] 4,042,920
Harsch et al. [45] Aug. 16, 1977

[54] MULTIPLEXING CIRCUIT FOR LIQUID CRYSTAL DISPLAY

[75] Inventors: Thomas B. Harsch, Stow; Edd Dems, Parma, both of Ohio

[73] Assignee: Hoffmann-La Roche Inc., Nutley, N.J.

[21] Appl. No.: 713,755

[22] Filed: Aug. 12, 1976

Related U.S. Application Data

[63] Continuation of Ser. No. 320,581, Jan. 2, 1973.

[51] Int. Cl.[2] .......... G06F 3/14

[52] U.S. Cl. .......... 340/324 M; 340/336; 350/160 LC

[58] Field of Search .......... 340/324 M, 324 R, 336, 340/166 EL; 350/160 LC

[56] References Cited

U.S. PATENT DOCUMENTS

| | | | |
|---|---|---|---|
| 3,503,673 | 3/1970 | Heilmeier et al. | 340/324 M |
| 3,532,813 | 10/1970 | Lechner | 350/160 LC |
| 3,653,745 | 4/1972 | Mao | 350/160 LC |

OTHER PUBLICATIONS

*Liquid Crystal Polychromatic Display Device*; Freiser, IBM Tech. Discl. Bull., vol. 15, No. 2, July 1972, pp. 700–701.

*Primary Examiner*—Marshall M. Curtis
*Attorney, Agent, or Firm*—Samuel L. Welt; Bernard S. Leon; Mark L. Hopkins

[57] ABSTRACT

A multiplexed electrical control circuit is provided for use with optical display devices of the type wherein electrical intelligence is translated into optical images of letters or numbers or other patterns through the use of a liquid crystal shutter device fully described in a copending application Ser. No. 136,441, filed Apr. 22, 1971. The shutter device comprises a layer of liquid crystal material sandwiched between opposing parallel plates coated with transparent conducting films. The shutter device, or liquid crystal cell, is disposed between a pair of polarizers such that the application of electrical potential across a character, digit, or other image-defining segment and an opposing position-designating film will cause light to be transmitted or to be cut off, depending upon the orientation of the two polarizers. The multiplexing concept of the invention is based upon the discovery that the character, digit or other image-defining signal and the position-representing signal need to coincide only for a very brief period of time to switch a selected segment, in a given position, to an ON state. The switching is accomplished through a diode or other unidirectional conducting device so that the selected display element will hold its ON state until the voltage decays below the threshold as determined by the RC time constant. Each liquid crystal cell existing between a selected character segment and its selected opposing character position backing film then becomes an individually-actuable light shutter with a memory capacity due to its capacitive storage characteristic. As a result, it becomes possible to multiplex the control of many similar character or digit positions using the same character defining segment control signals.

6 Claims, 4 Drawing Figures

MULTIPLEXING CIRCUIT FOR LIQUID CRYSTAL DISPLAY

This is a continuation of application Ser. No. 320,581 filed Jan. 2, 1973.

CROSS-REFERENCES TO RELATED APPLICATIONS

Application Ser. No. 136,441, filed Apr. 22, 1971; application Ser. No. 250,890, filed May 8, 1972; and application Ser. No. 233,671, filed Mar. 10, 1972, all assigned to the Assignee of the present invention.

BACKGROUND OF THE INVENTION

As is more fully set forth in above-mentioned application Ser. No. 136,441, nematic-phase liquid crystal layers sandwiched between opposing parallel transparent plates rubbed unidirectionally with transparent conducting films on those surfaces contacting the liquid crystal layer provide a unit whose optic axis lies in the direction of the unidirectional rubbing. If the directions of rubbing are at an angle with respect to each other, such as 90°, the effect has been found to be an optical media which rotates the plane of polarization by the angular difference between the directions of rubbing. It has also been found that, if an electric or magnetic field of predetermined magnitude is applied across opposing sections of selected films, the rotation of polarization is terminated.

According to the concept of application Ser. No. 136,441, the application of the field across selected conducting film areas can be used to establish a plurality of selectively operable light shutters by disposing the liquid crystal unit between parallel or crossed-polarizers. While many modes of operation are possible, the emphasis herein will relate to the control of displays where there is a plurality of character, image or digit positions and where, in each position, there is a plurality of segments which must be selected by respective signals, preferably electric potentials, to define a character, image or digit. For simplicity, the invention will be discussed with respect to a display for decimal digits, where each digit selection includes seven film segments referenced, respectively, as segments A, B, C, D, E, F and G. In a four-decimal digit display, thre are four sets of the digit defining segments. Four sets of the digit defining segments are on the inner surface of one of the opposing plates containing the liquid crystal and, on the inner surface of the other plate, there are four distinct digit position selecting films each arranged to align with a corresponding one of the four sets of digit defining segments. It will be understood that any number of digit segment sets may be used and that many variations in character or image configurations may be controlled.

The problems arising in controlling a multidigit display of the type mentioned above is that the total number of control signals, prior to the present invention, has been the product of the number of digit positions times the number of digit characterizing segments or dots in each position. This has been solved, in the prior art, by introducing memory elements such as flip-flops or storage capacitors to hold the digit or character configuration for each digit position or other complicated electrical means to permit the multiplexed scanning of a plurality of positions by means of a single control where only the segment selections of a single character are presented at one time. Basically, the problem has been to simplify the control from a complex parallel control where all digits or characters had to be presented simultaneously to a simplified control where the character positions can be scanned to reestablish the proper display for that position alone.

SUMMARY OF THE INVENTION

It has been found that the liquid crystal shutter existing between each digit or character defining segment and the associated digit or character position defining area, sometimes referred to as the position backing film, operate as a storage capacitor, so that no additional circuits are required to establish the necessary memory characteristic. Although many different multiplexing modes are possible, the inventive concept will be illustrated herein by assuming that the binary coded decimal (BCD) code of one of the four stages of a decimal counter (again for simplicity only) are selected through a known type of multiplexer and converted into appropriate segment signal levels to "enable" the respective digit segments. In a typical case, the enabling is accomplished by applying a relatively low signal to the selected segment. The segment enabling signals are applied to all of the corresponding segments in all of the digit positions. Thus, in a four-digit display with seven segments required to define all digits from 0 through 9, segments A, B and C in a segment code defining the number 7 would be applied to all four digit positions. The operation or switching of the various shutters associated with the enabled segments, however, is made to depend upon the application of a potential to only a single selected digit position, defined by a corresponding backing film, where the potential is such that the difference of potential established across the enabled segments and the potential applied to the selected digit position is sufficient to "switch" the shutter. The term "switch" is used because in the case where the shutter is normally closed with the transmission of light being blocked through the use of parallel polarizers, the application of the "enabling" segment selection and then the coincidental application of the "switching" or "strobing" position selection causes light to be transmitted or turned ON. On the other hand, where the shutter is normally open, the device will transmit light, or reflect light, until there is a coincidence of the enabling segment selection signals and the digit position signal. This switching will then cut off the light through those segments which have been both enabled and backed by a film receiving a digit position selection pulse or signal. Thus, in a normally closed system, the invention serves to control the display of selectively illuminated digits on a dark background and are sometimes referred to as transmissive displays; whereas in a normally open system, the invention serves to cut off the passage of light through enabled segments opposite to selected digit position backing films and results in a display where the digits appear dark or black against a light or white background. The normally open system is sometimes referred to as a reflective display. The differences between the so-called transmissive and reflective displays are fully set forth in the above-referred to copending application Ser. Nos. 250,890 and 233,678.

The segment to backing film capacitance varies somewhat on the order of 5–20 picofarads as a function of the type of and thickness of the liquid crystal layer, and of course, the area of the segments. In series with the segment is the lead connecting the segment to the edge of the liquid crystal displays where it serves as a connection to the electronics. The resistance of the lead could be as high as 50,000 ohms ($5.10^4 \times 5.10^{-12} = 25.10^{-8}$ or 0.25 usec). The RC lead time constant is such that the capacitance can be charged within a microsecond to apply voltage to the segment. On a turn-off signal, however, the unidirectional coupler does not conduct, therefore, the charge on the capacitance must bleed off through the liquid crystal material where the impedance is made to be very high. This time to discharge the capacitance could be as long as 1 second. (As a thought, if a digit can be turned ON in 1 usec [1/1,000,000 sec], and it will remain ON for 1 second after the charging signal is removed, then 1 million digits can be scanned as a maximum design limit, however impractical that might be).

Basically, the concept of the invention is to electronically select one of a plurality of counter or accumulator register stages which may form part of a computer or calculator and to then strobe that character backing film in the position corresponding to the selected character to be displayed. The selected character may be in a code such as a binary coded decimal and is converted into a segment selection code which acts as the enabling signal set which operates in combination with the position strobe to charge those shutters in the correct character position to illuminate or darken the corresponding segments to display the proper character.

The above and other objects and features of the invention will become apparent from the following detailed description taken in connection with the accompanying drawings which form a part of this specification, and in which.

Figure 1:
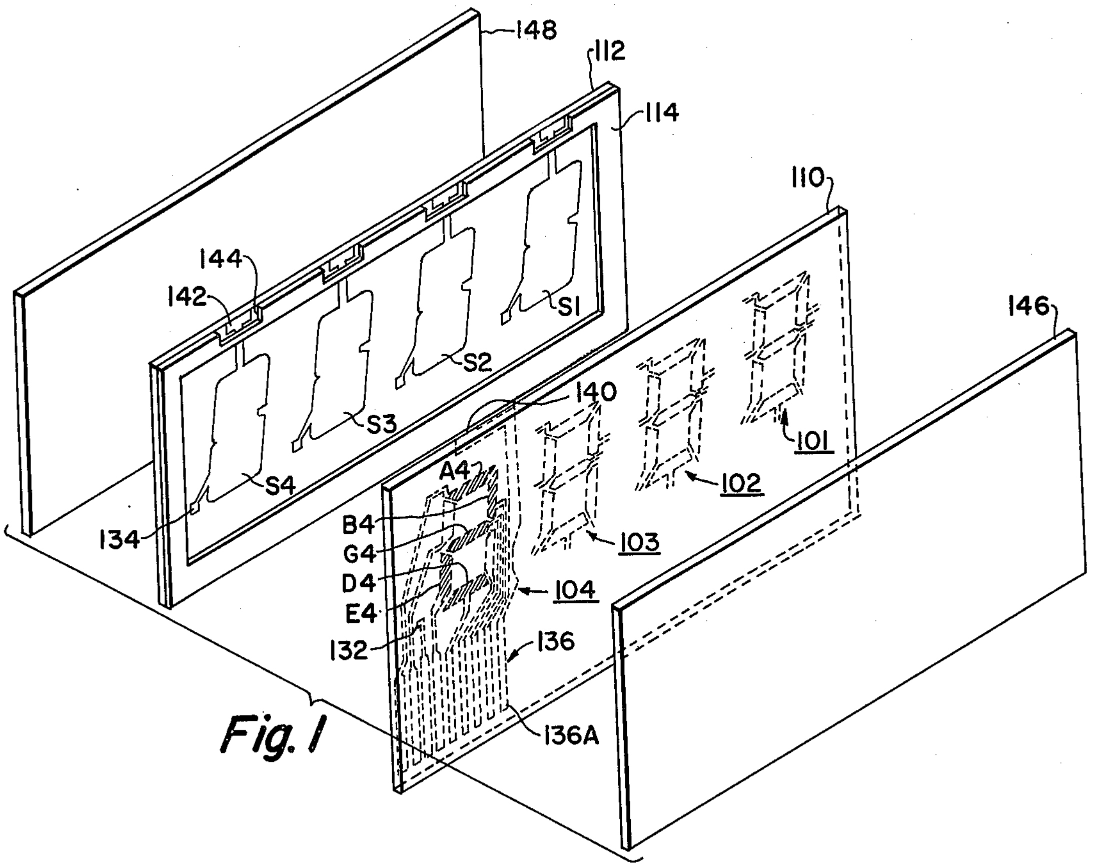
FIG. 1 is a perspective view of a display with which the capacitive liquid crystal multiplexed memory system of the invention can be used.

With reference now to the drawings, and particularly to FIG. 1, a liquid crystal cell is shown with which the multiplexing equipment of the invention can be used, It comprises a pair of transparent plates 110 and 112 separated by means of a suitable gasket 114. The gasket 114 spaces the plates in an amount equal to about 0.0005 inch; and in the space between the plates 110 and 112 and within the enclosure formed by the gasket 114 is a layer of nematic-phase liquid crystal material such as that described in copending application Ser. No. 113,948, filed Feb. 9, 1971 and assigned to the Assignee of the present application.

As shown in FIG. 1, the opposing surfaces of the transparent plates 110 and 112 have formed thereon patterns of transparent conductive material such as tin oxide or indium oxide. The plate 112 is provided with four patches of transparent conductive material S1, S2, S3 and S4; while the other transparent plate 110 is provided with four sets of mutually-insulated strips of transparent conductive material, the four sets being identified generally by the reference numerals 101, 102, 103 and 104. Patches 132 and 134 on the opposite plates can be used to form a decimal point, if desired. When the plates 110 and 112 are bonded to opposite sides of the gasket 114, the transparent conductive patches S1–S4 will be aligned with the sets of strips 101–104 on the plate 110.

The operation of the liquid crystal cell will be described hereinafter; however it will be appreciated that when all of the strips of the set 104, for example, are opaque while the surrounding areas transmit light, the resulting configuration will represent the numeral 8. Similarly, by causing selected ones of the strips in set 104 to become opaque, any numeral from 1 through 0 can be made to appear.

The various mutually-insulated conductive strips in the sets 101–104 are adapted to be connected through a plurality of mutually-insulated strips of transparent conductive material 136 to external leads, not shown, Note that the strip 136A extends from the bottom of plate 110 all the way to the top thereof where it terminates in a horizontal portion 140 which is directly opposite a corresponding horizontal portion 142 connected to the patch S4 of electrically conductive material on plate 112. An electrically conductive epoxy material or the like is placed in an opening 144 in the gasket 114 so as to interconnect the portions 140 and 142. With this arrangement, one terminal of a potential source can be connected to the strip 136A and, hence, to the conductive patch S4 on one side of the liquid crystal material; while selected ones of the remaining strips 136 can be connected to the other terminal of the same potential source, thereby establishing a potential gradient resulting in an electric field across the liquid crystal material in selected areas, depending upon which one of the strips 136 is energized (i.e., connected to the other terminal of the potential source).

In the manufacture of the liquid crystal unit, the layers of transparent conductive material that are in contact with the nematic-phase liquid crystal material must be prepared by being stroked or rubbed unidirectionally with, for example, a cotton cloth. Furthermore, the transparent conductive material on plate 112 must be rubbed unidirectionally at right angles to the direction of rubbing of the transparent conductive material on plate 110. The effect of this is to produce a twisted nematic structure in the intervening liquid crystal material as is more fully explained in the aforesaid copending application Ser. No. 136,441. In contact with the plate 110 is a first polarizing plate 146; and on the backside of the plate 112 is a second polarizing plate 148. In the preferred embodiment of the invention, the planes of polarization of the two plates 146 and 148 are at right angles to each other, the plane of polarization of the plate 146 being parallel to the direction of rubbing of the transparent conductive material on plate 110.

In the operation of the device, and assuming that an electrical potential is applied to selected ones of the strips in set 104 as well as to the patch S4, those strips to which an electrical potential is applied will appear opaque while the surrounding area will transmit light, thereby forming a desired numeral. This is because polarized light will not pass through those areas of the liquid crystal cell across which a potential is applied; while it will pass through the remainder of the liquid crystal cell. For a further and more complete description of the exact theory and operation of the cell in this regard, reference may be had to the aforesaid copending application Ser. No. 136,441.

Figure 2:
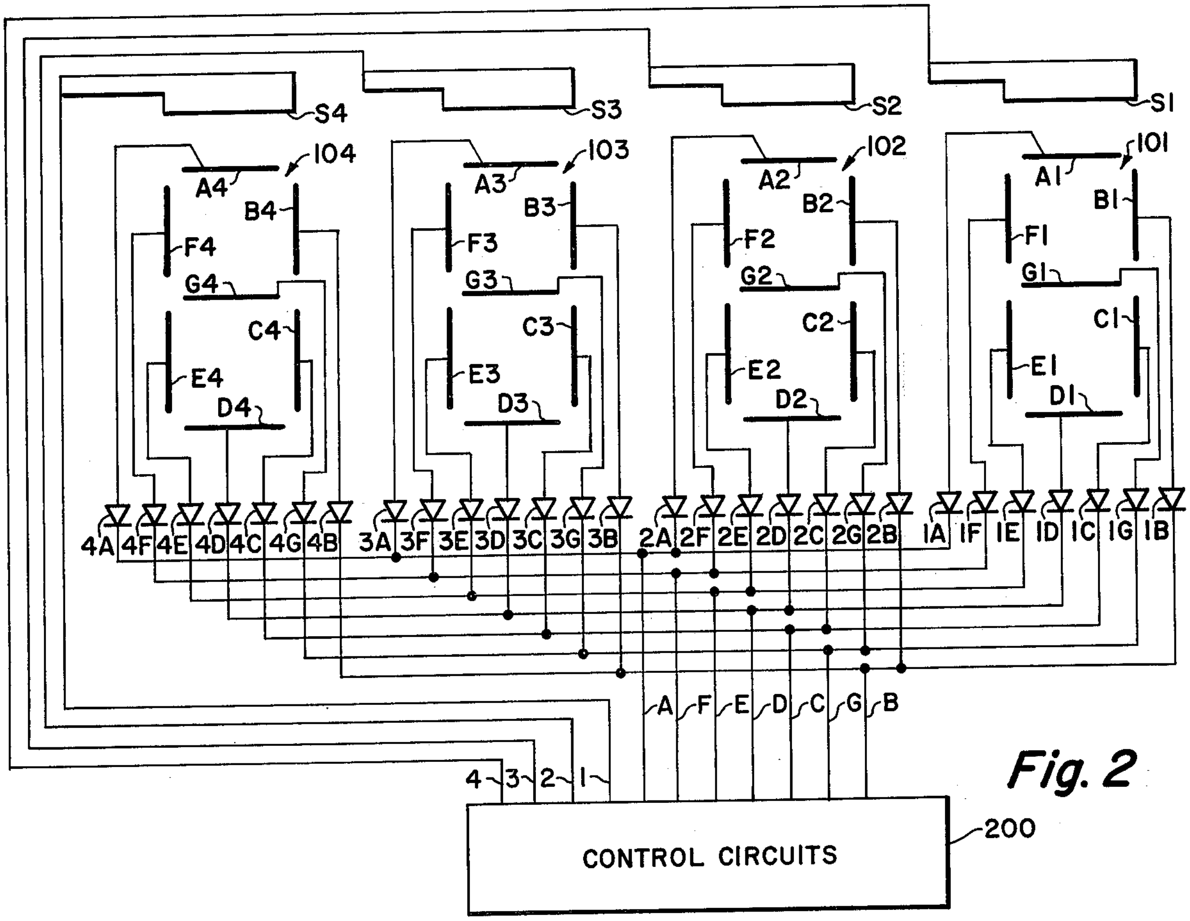
FIG. 2 is a schematic diagram illustrating a specific case where four decimal digits are multiplexed for display.

Reference is now made to FIG. 2 where the sets of mutually-insulated strips of transparent conductive material are again represented by the numerals 101–104;

while the patches on plate 112 are again identified as S1–S4. The number 2, for example, can be turned ON by switching the A4, B4, G4, E4 and D4 shutters (FIG. 1) to the enabled state while simultaneously activating the position selecting electrode or patch referenced as S4. This control sequence will be more fully understood after consideration of FIG. 4. It will be understood that the same control may be used to illuminate or transmit light through a shutter where parallel polarizers are used. In this case, white or light digits would appear on a dark or black background.

According to the basic concept of the control, the segment enabling signals referenced as A, B, C, D, E and F from the control circuits 200 are applied through four sets of gating diodes with corresponding reference numerals. Segment control signal A, for example, is applied to gating diodes 4A, 3A, 2A and 1A; and these diodes are connected to respective segments in the corresponding digit position. It is the coincidence of signals A and 4 coming from control circuit 200 in FIG. 2 that switches the shutter existing between segment A4 and patch 104. The other connections will be apparent from this example.

Figure 3:
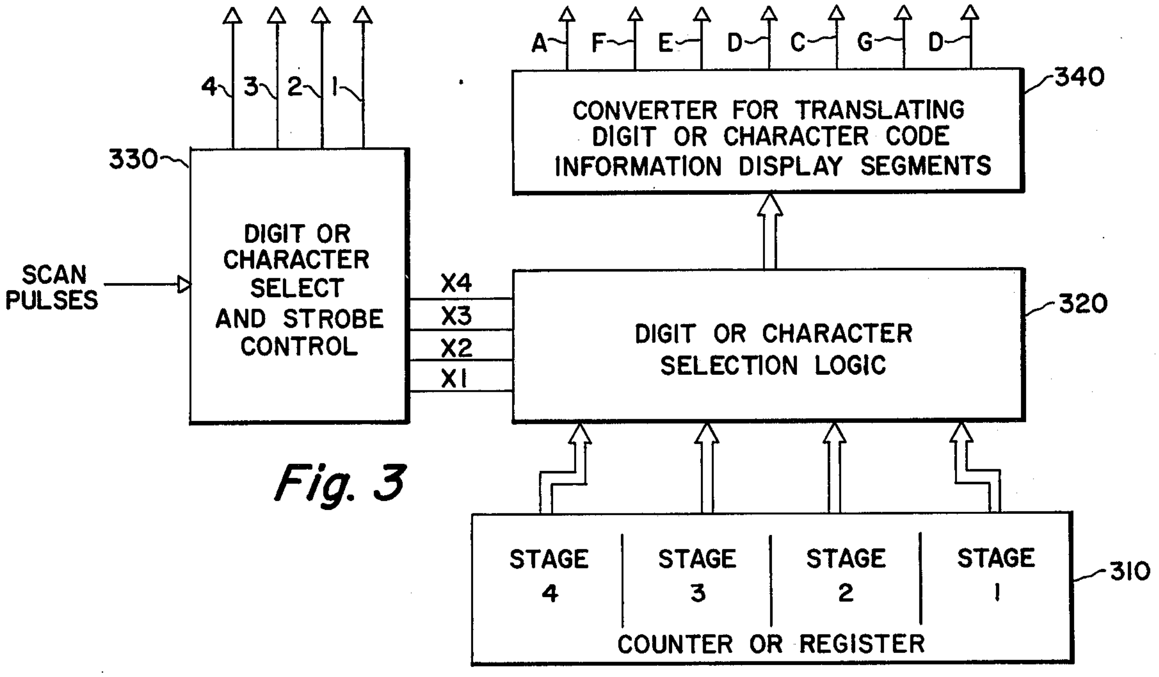
FIG. 3 is a block diagram of the means within control circuits 200 of FIG. 2 for developing the appropriate strobe and selection signals.

Reference is now made to FIG. 3, where the basic means required for the segment and position control are presented in block diagram form. A four-stage counter or register 310 is shown having its output signals applied to digit or character selection logic 320. As an illustrative case, it will be assumed that each stage of means 310 is a binary coded decimal (BCD) counter state or a register holding a number in the same code. Thus, each bus coupling a stage of logic 320 contains four leads carrying signals in a BCD code.

Four selection control signals X4, X3, X2 and X1 are applied to logic 320 from control 330 which also produces the position strobe signals 4, 3, 2 and 1. In some cases, the same signals may be appropriate for both character selection and strobing. The different notation is used simply to point out that there are two functions that must be performed. The digit character in a particular position of a counter or register to be displayed must be selected and the corresponding backing film or patch S1–S4 for that position must then be strobed. The function of logic 320 then is to present to converter 340 that character or digit code that is to be displayed, and converter 340 then translates the code into the appropriate segments or dots or other image representation desired for the particular position.

The operation of the system will be explained with reference to FIG. 4. In the case illustrated, it is convenient to assume that control 330 produces strobe pulses 4, 3, 2 and 1 in succession at a frequency that is sufficiently high to keep the shutter capacitance substantially charged all the time but not so high as to fail to fully charge this capacitance. It has been found in practice that frequencies in the range of 100 hertz to 100 kilohertz have been suitable.

The so-called enabling signal for a segment is that which causes the full strobe potential to appear across the selected segment and the then-selected position or backing film. As an example, it may be assumed that the ON strobe pulse level is in the order of 7 volts and that the enabling segment selection level is zero volts. If the segment is to be disabled, a raised segment selection level to prevent a particular shutter from being switched is applied. This may be in the order of 3 volts in a typical case where the liquid crystal does not switch until a potential difference of 5 volts is impressed (i.e., 7−3 volts is less than 5 volts).

Figure 4:
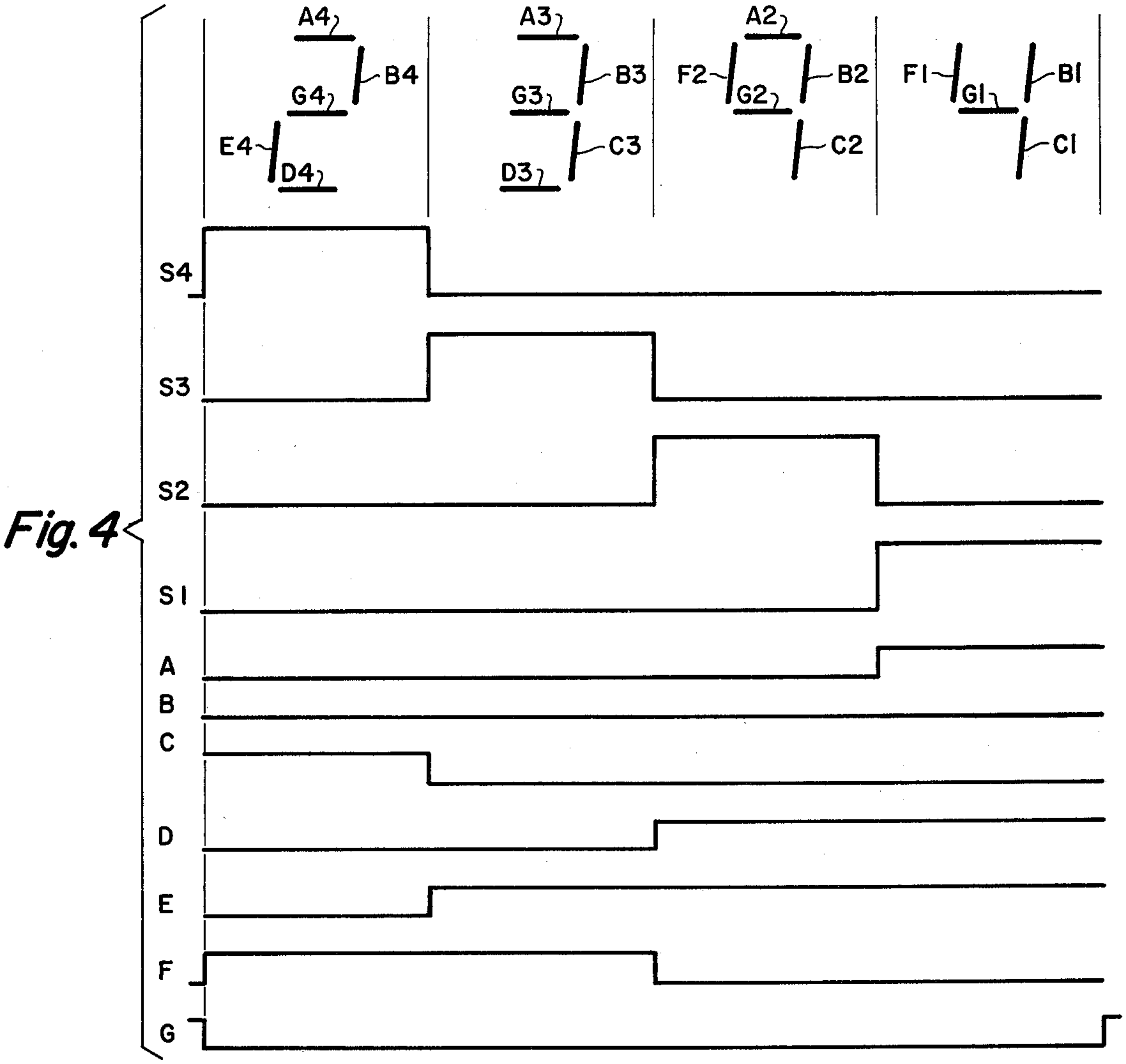
FIG. 4 is a composite set of waveforms illustrating a typical operation of the system for controlling the display of the number 2394.

Four pulse periods are shown in FIG. 4 corresponding to the four digit positions. In displays of fewer or more positions, there would be a corresponding change in pulse periods. In the period identified by the presence of pulse S4 applied to backing film 104, all segments are enabled except C4 and F4; during the S3 period, only E3 and F3 are disabled; during the S2 period, only D2 and E2 are disabled; and during the S1 period, only A1, D1 and E1 are disabled.

The disabling level has been selected so that when a strobe signal is OFF (zero volts), there can be no possibility of switching a liquid crystal shutter in reverse. Due to the high impedance of a back-biased diode, this could not happen over a long period of time but it is, nevertheless, an undesirable effect.

An important improvement of the invention comes from the fact that it is possible to develop all of the necessary controls for the multiplexed liquid crystal display with low cost, low voltage, integrated circuits requiring very little power. It has become possible, as the direct result of the invention, to control the displays of the copending applications referred to above with a single integrated circuit sometimes referred to as an MOS decoder. The additional complexity, cost and power consumption characteristics of prior art multiplexed displays have been completely eliminated.

From the foregoing, it can be seen that there are *n* sets of transparent conducting segments on one transparent plate and *n* patches of transparent conducting material on the other plate opposite each set. Furthermore, the number of segments *x* in each set is the same. *x* conductors are connected to corresponding ones of the segments in each set; and *n* conductors are connected to the respective patches. Pulses are applied through the *x* conductors to the segments of all sets simultaneously in a sequence wherein the pulse sequence on the *x* conductors is adapted to change *n* times during a complete cycle whereby *n* different configurations can be made to appear at any one of the sets of segments. At the same time, and during a complete cycle, *n* pulses are applied to the conducting patches whereby different configurations can be made to appear to the eye at successive segment locations.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In an optical display system wherein electrical intelligence is converted into optical images through the use of a liquid crystal display, the combination of a layer of liquid crystal material sandwiched between a pair of transparent parallel plates, the inner surface of one of the plates in contact with the liquid crystal material having sets of mutually-insulated transparent conductive segments thereon which are arranged in essentially identical patterns, the inner surface of the other of said plates in contact with the liquid crystal material having patches of transparent conducting material thereon directly opposite cooperating sets of segments whereby establishment of an electrical potential between a segment and its cooperating patch on the opposite plate will change the optical appearance of that segment, there being *n* sets of segments and *n* patches on the opposite plate with $x$ segments in each set, $x$ conductors each connected to a corresponding one of the segments in each set, $n$ conductors connected to the respective patches, means for applying pulses through the $x$ conductors to the segments of all sets simultaneously in a sequence wherein the pulse sequence on the $x$ conductors is adapted to change $n$ times during a complete cycle, and means for applying during said cycle $n$ pulses to said $n$ conductors and the conducting patches, said $n$ pulses being applied to the $n$ conductors in succession and simultaneously with application of pulses to the $x$ conductors whereby different configurations can be made to appear to the eye at successive segment locations.

2. The combination of claim 1 including unidirectional current devices in each of said $x$ conductors.

3. The combination of claim 1 wherein said liquid crystal material is of the nematic type, means for producing a twisted nematic structure is said layer of liquid crystal material, and polarizers on opposite sides of the layer of liquid crystal material.

4. The combination of claim 3 wherein the pulses applied through the $x$ conductors and said conducting patches each have two levels such that the potential difference between the voltage levels of the pulses when in their respective opposite levels will be sufficient to untwist said nematic structure.

5. The combination of claim 1 wherein the pulses applied to said conducting patches have a duration sufficient to charge the capacitance existing between the patch and its associated set of segments.

6. The combination of claim 5 wherein the discharge time constant of the capacitance existing between the patch and its associated set of segments is substantially longer than the time to complete a cycle such that each ON segment of a set of segments remains ON for a time while segments in another set are being actuated.

* * * * *